Patented Dec. 15, 1953

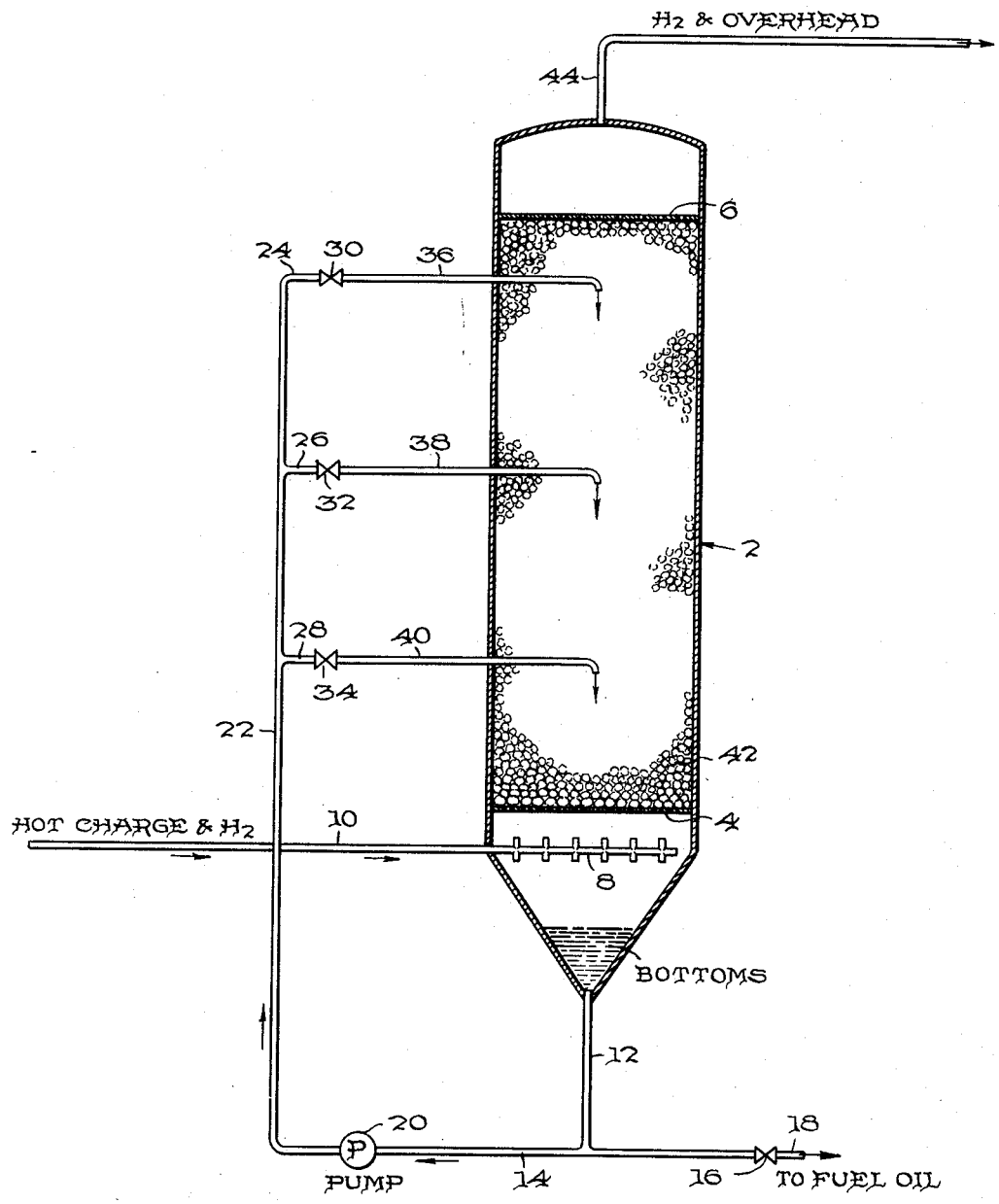

2,662,846

UNITED STATES PATENT OFFICE 2,662,846

HYDROGEN TREATMENT OF HEAVY HYDROCARBONS

Charles W. Montgomery and William A. Horne, Oakmont, Pa., assignors to Gulf Research & Development Company, Pittsburgh, Pa., a corporation of Delaware Application December 30, 1950, Serial No. 203,618

5 Claims. (Cl. 196—53)

This invention relates to the conversion of high boiling hydrocarbons into lower boiling products particularly in the gasoline range by treatment with hydrogen.

Destructive hydrogenation of high boiling hydrocarbons is of course well known. Conversion of such materials can be satisfactorily accomplished in this manner, but it requires rather high pressures of the order of 3000 p. s. i. and above. There are compelling economic reasons for employing lower pressures. Also, the products obtained by such high pressure treatment are of inferior quality. Attempts to use lower pressures, in general, have been unsatisfactory mainly due to the fact that carbon deposition is markedly increased. This has necessitated excessive regeneration of the catalyst both with regard to frequency of regeneration and the regeneration requirement in the form of apparatus, diluent steam or flue gas, etc. employed during regeneration.

This invention has for its object to provide a destructive hydrogenation process whereby the foregoing difficulties can be overcome. Another object is to provide a destructive hydrogenation and/or hydrodesulfurization process whereby high boiling hydrocarbons are converted into lower boiling products, particularly gasoline in good yield and at moderately low pressures. A still further object is to provide a hydrodesulfurization process operating at relatively low pressures in which the amount of carbon deposition and the regeneration requirement is reduced. Another object is to provide a destructive hydrogenation process operating at relatively low pressures which gives high yields of improved products. Other objects will appear hereinafter.

These and other objects are accomplished by our invention which includes subjecting the high boiling hydrocarbon to destructive hydrogenation in the presence of hydrogen and at a pressure between about 100 and 2000 p. s. i. by heating the high boiling hydrocarbon to partially vaporize it, passing the resultant vapor together with hydrogen containing gas upwardly through a fixed bed of hydrogenation catalyst, introducing the liquid portion of the high boiling hydrocarbon into said catalyst bed, preventing formation of a body level of liquid in contact with the catalyst bed, removing reaction products and hydrogen from the upper portion of the catalyst bed, collecting liquid draining from the catalyst bed, at a point below the catalyst bed, withdrawing a portion of this collected liquid and introducing the remaining portion of the collected liquid onto the catalyst bed at a point above that at which the vapor portion of the charge initially contacts the catalyst bed.

In the following examples and description we have set forth several of the preferred embodiments of our invention but it is to be understood that these are given by way of illustration and not in limitation thereof.

It will be noted from the foregoing that our invention contemplates the simultaneous use of a number of steps or conditions which give the beneficial results indicated; that is, a high degree of conversion into products of good quality with the advantage of operation at low pressure and reduction in carbon deposition and regeneration requirement. This combination of steps has the outstanding advantage that it gives these beneficial results while employing relatively low pressures. The economic advantage of employing low pressures is, of course, quite apparent.

The invention contemplates avoiding contact of a continuous body of the heavy liquid hydrocarbon with the catalyst. This is important since formation of such a body prevents adequate contact between the catalyst, hydrogen and the hydrocarbon. It is impossible to obtain such contact if the catalyst is immersed in a continuous body of liquid. Also, carbon formation will be excessive in the area where such a continuous body of liquid is formed. It is not necessary to avoid formation of small rivulets or streams and as a matter of fact our invention contemplates contacting of the catalyst with the liquid but maintaining it in a dispersed or relatively attenuated form so that adequate contact between liquid hydrocarbon, catalyst and hydrogen will take place.

Our invention also contemplates introducing or directing the vapor portion of the charge into the lower portion of the fixed catalyst bed so that it passes upwardly therethrough. This is essential because it results in more thorough and longer contact between the attenuated liquid and the catalyst and hydrogen. Also, this type of upflow operation prevents formation of a liquid body in contact with the catalyst.

As indicated our invention contemplates collecting liquid draining from the catalyst bed and recycling it onto the catalyst bed after removal of part of the collected liquid for use as a fuel or for any purpose desired. This recycling is important since it permits repeated distribution of the liquid onto the catalyst bed and therefore repeated contact between the liquid, the catalyst and the hydrogen. The recycling is carried out in such a manner that the recycled liquid is relatively evenly distributed in the catalyst bed as it flows downwardly countercurrent to the upflowing vapors and hydrogen. This is not difficult to accomplish since the catalyst bed is usually made up of pellets or pieces of catalyst which would tend to distribute the liquid from one piece to another and also because of the tendency of the upflowing vapor and hydrogen to assist in this distribution. Distributing heads of obvious design can be employed if desired. It is preferred that the liquid be distributed onto the upper part of the catalyst bed since this gives better and longer catalytic contact.

It has been known for some time in connection with ordinary catalytic cracking that recycling eventually results in a recycle liquid which has high resistance to further cracking; i. e., it becomes refractory. It has also been known that this does not ordinarily take place in destructive hydrogenation operations because the recycle liquid is converted by the destructive hydrogenation conditions into a less refractory stock before it is again recycled. However, this has been the experience only in connection with destructive hydrogenation conditions operated at high pressures. We have found that refractory materials are built up at relatively low pressures such as contemplated herein and in order to avoid excessive recycle rates and build-up of refractory material which leads to coke formation it is necessary to withdraw a portion of the recycle.

The amount of recycle liquid which is withdrawn will depend upon the nature of the hydrocarbon treated and the specific operating conditions. One skilled in this art can easily determine the optimum amount of material to be withdrawn by simple experiments carried out under the conditions contemplated and on the particular charge stock under consideration. For instance if the crude charge stock is such that about 3 per cent of highly refractory or tarry materials will be formed under the conditions of operation the amount of liquid withdrawn from the system should be equivalent to about 3 per cent of the charged material. If, under the conditions of operation, about 15 per cent of the charge stock drains to the bottom of the reactors then 12 per cent, that is, 80 per cent of the liquid, would be recycled and 3 per cent, that is 20 per cent of the liquid, would be withdrawn.

In general not more than about 5 per cent of the charge stock need be withdrawn although in some cases the amount withdrawn may be somewhat greater than this figure. Usually the high boiling charge stocks necessitate greater withdrawal of liquid than the lower boiling of the charge stocks contemplated herein.

Our invention is applicable to the treatment of any high boiling hydrocarbon which contains residual constituents which cannot be vaporized under the conditions of treatment without decomposition. Examples of materials which can be so treated are crude petroleum, reduced or topped crude and tars or heavy fractions derived from the extraction or destructive hydrogenation of coal, heavy petroleum products, etc.

Our invention contemplates the use of any hydrogenation catalyst. Hydrogenation catalysts comprising oxides or sulfides of group VI and VIII metals have been found to be particularly useful for destructive hydrogenation conditions. These catalysts can be used with advantage in our process. Examples of suitable catalysts are nickel, cobalt and iron metals or oxides, nickel tungstate, cobalt molybdate, chromium, molybdenum and tungsten oxides or sulfides, etc. These catalysts are generally distributed on or otherwise composited with a porous carrier such as activated alumina, silica gel, silica-alumina cracking catalyst, etc. Such porous carriers should be of a refractory nature and have a relatively large surface area.

Our process not only accomplishes destructive hydrogenation but it will result in desulfurization of the heavy hydrocarbon in the event that it contains sulfur. Such desulfurization may be either of the catalytic type or of the type in which sulfur is absorbed or taken up by the catalyst on contact. In the latter modification it is ordinarily desirable to terminate the on-stream reaction when the contact has taken up so much sulfur that hydrogen sulfide begins to appear in the effluent. The contact is regenerated in the ordinary fashion to remove the sulfur and carbon and the on-stream period is then again initiated with or without pretreatment of the contact with hydrogen. In the case of catalytic hydro desulfurization or in the case of treatment of a heavy hydrocarbon containing little or no sulfur the process is continued until the catalyst is reduced in activity by deposition of coke or carbon sufficient to require regeneration. This is then accomplished in the ordinary fashion such as by passing air and steam therethrough to burn off the carbon at a controlled rate.

In the accompanying drawing we have illustrated a diagrammatic elevation, partly in section, of suitable apparatus in which our invention can be carried out. Referring to this drawing, numeral 2 designates a reactor provided with perforated retaining plates 4 and 6 at the lower and upper portions thereof, respectively. Numeral 8 designates a distributing head positioned below perforated plate 4 to which head is connected conduit 10 for introduction of hydrogen and the liquid-vapor charge. Numeral 12 designates a conduit connected to the lower extremity of reactor 2 which conduit is connected to conduit 14 provided with valve 16 to which is connected withdrawal conduit 18.

Pump 20 has its intake side connected to conduit 14 and its exhaust side is connected to conduit 22 which is provided with branch conduits 24, 26 and 28 connected to valves 30, 32 and 34, respectively. These last-mentioned valves are respectively connected to conduits 36, 38 and 40 which lead into different portions of the reactor. Numeral 42 designates a fixed catalyst bed positioned between grids 4 and 6 and numeral 44 designates a withdrawal conduit positioned at the upper end of reactor 2.

In operating the apparatus illustrated in the drawing the partially vaporized mixture of heavy hydrocarbon and hydrogen is introduced by way of conduit 10 and distributing head 8 into the lower portion of the reactor 2 so that it flows upwardly through the catalyst bed 42. During passage upwardly through the bed conversion of liquid and vaporous hydrocarbons into lower boiling products such as gasoline takes place. The vaporous products and hydrogen are removed through conduit 44. A part of the liquid portion of the charge will remain uncracked or unconverted to vapors and it will tend to drain to the base of the reactor. Prevention of contact with this accumulated liquid and the catalyst bed is accomplished by providing small but adequate space below the catalyst bed for the liquid to accumulate without its upper level actually reaching the catalyst bed. This liquid is withdrawn through conduit 12. A portion of this withdrawn liquid is removed from the system by opening valve 16. This withdrawn liquid is removed by way of conduit 18. The remaining collected liquid flows through conduit 14, pump 20, and conduit 22 and is then distributed in desired manner in the catalyst bed by flowing through conduits 24, 26, and 28 controlled by valves 30, 32 and 34, respectively. This liquid flows from these valves through conduits 36, 38 and 40, respectively, onto the catalyst bed. This liquid is then distributed in the catalyst bed as mentioned above and flows downwardly countercurrently to the upflowing vapors and hydrogen.

Only small amounts of the liquid portion of the charged mixture will be carried up onto the catalyst bed by entrainment. Most of the liquid portion of the charge will collect in the base or sump of the reactor and be circulated up onto the bed with the recycle as previously explained. It is satisfactory to initially introduce all of the liquid portion of the vapor-liquid mixture onto the catalyst bed, but in order to accomplish this the distributing head 8 must be positioned above the catalyst retaining plate 4. This would result in considerable contact between the liquid portion of the charge and the catalyst before the liquid collected as bottoms and was recycled. On the other hand the liquid can be separated from the vapors and separately introduced into any part of the catalyst bed. As a matter of fact this mode of operation takes place to a considerable extent in the apparatus illustrated in the drawing, i. e., the liquid is largely separated from the vapors in the base of the reactor and is then separately introduced onto the catalyst bed.

In general we contemplate a ratio of hydrogen to petroleum hydrocarbon feed of about 100 S. C. F./bbl. to 20,000 S. C. F./bbl. A preferred ratio of hydrogen to hydrocarbon is between about 5,000 and 10,000 S. C. F./bbl. Temperatures of 600 to 900° F. and preferably 750 to 950° F. are generally satisfactory. Pressures of 100 to 2,000 p. s. i. g. can be employed. Pressures of between 500 to 1,000 are in general preferred, particularly when desulfurization is of considerable importance. A space velocity between about 0.2 and 10 liquid volumes of hydrocarbon charge per hour per volume of catalyst may be used. A space velocity between about 0.5 and 2 is preferred.

As illustrative of our invention a number of hydrodesulfurization runs were made under the conditions and with the results set forth in the table.

What we claim is:

1. A process for destructively hydrogenating a high boiling hydrocarbon charge which contains residual components, which comprises heating said charge so as to vaporize a portion of it, passing the resultant vapor in conjunction with hydrogen-containing gas upwardly through a fixed hydrogenating catalyst bed, at a pressure of between about 100 to 2,000 p. s. i., introducing the liquid portion of the high boiling hydrocarbon into said hydrogenating catalyst bed, preventing formation of a body level of liquid in contact with the hydrogenating catalyst bed, removing reaction products from the upper portion of the catalyst bed, collecting liquid draining from said catalyst bed at a point below the catalyst bed, withdrawing a portion of this collected liquid, and introducing the remaining portion of said collected liquid into the same catalyst bed at a point above that at which the vapor portion of the charge initially contacts the catalyst bed.

2. A process for destructively hydrogenating a crude petroleum oil charge which contains residual components, which comprises heating said charge so as to vaporize a portion of it, passing the resultant vapor in conjunction with hydrogen-containing gas upwardly through a fixed hydrogenating catalyst bed, at a pressure of between about 100 and 2,000 p. s. i., introducing the liquid portion of the crude petroleum oil into said hydrogenating catalyst bed, preventing formation of a body level of liquid in contact with the hydrogenating catalyst bed, removing reaction products from the upper portion of the catalyst bed, collecting liquid draining from said catalyst bed at a point below the catalyst bed, withdrawing a portion of this collected liquid, and introducing the remaining portion of said collected liquid into the same catalyst bed at a point above that at which the vapor portion of the charge initially contacts the catalyst bed.

3. A process for destructively hydrogenating a high boiling hydrocarbon charge which contains residual components, which comprises heating said charge so as to vaporize a portion of it, passing the resultant vapor in conjunction with hydrogen-containing gas upwardly through a fixed hydrogenating catalyst bed, at a pressure of between 100 to 2,000 p. s. i., introducing the

*Table*

| Run No | 1 | | 2 | | 3 | | 4 | |
|---|---|---|---|---|---|---|---|---|
| Catalyst | NiO | | NiO | | NiO.WO$_3$ | | NiO.WO$_3$ | |
| Temp., of | 850 | | 850 | | 850 | | 800 | |
| Pressure, p. s. i. g | 500 | | 500 | | 500 | | 1,000 | |
| Liq. Hourly Space Velocity | 1 | | 1 | | 1 | | ¼ | |
| Through Put | 4 | | 4 | | 4 | | 2 | |
| H$_2$, S. C. F./Bbl | 2,000 | | 5,000 | | 5,000 | | 10,000 | |
| | West Texas Crude | | Kuwait Crude | | | | Baxterville Crude | |
| Charge: | | | | | | | | |
| °API | 34 | 44.7 | 31.4 | 41.8 | | 48.1 | 16.1 | 48.4 |
| Percent S | 1.45 | 0.23 | 2.5 | 0.59 | | 0.18 | 3.4 | 0.11 |
| Rec., Vol. Percent | | 92.1 | | 92.7 | | 86.6 | | 91.1 |
| Rec., Wt. Percent | | 85.3 | | 86.7 | | 77.9 | | 77.2 |
| Dry Gas, Wt. Percent | | 4.0 | | 3.0 | | 9.5 | | 5.6 |
| Residue on Catalyst, Wt. Percent of Charge | | 4.8 | | 2.1 | | 8.1 | | 9.4 |
| Dry Gas No. 3/bbl | | 176 | | 131 | | 366 | | 263 |
| Distillation— | | | | | | | | |
| Percent at 392° F | 30 | 46.1 | 25 | 35 | | 57 | 2.5 | 59 |
| Percent at 500° F | 42 | 67.8 | 35 | 55 | | 79 | 8.1 | 80 |
| Percent at 590° F | 58 | 84.0 | 44 | 72 | | 94 | 16.9 | 93 |
| Car. Res. on Btms. above 590° F., Percent | 5.91 | .012 | 9.1 | 0.06 | | 0.3 | 16.4 | 0.65 |
| Octane No. Research— | | | | | | | | |
| Clear | 45 | 60.1 | 38.9 | 50.8 | | 59.8 | | 69.3 |
| +3 cc. TEL | 56.1 | 79.1 | 59.4 | 70.9 | | 79.5 | | 82.8 | liquid portion of the high boiling hydrocarbon into said hydrogenating catalyst bed, preventing formation of a body level of liquid in contact with the hydrogenating catalyst bed, removing reaction products from the upper portion of the catalyst bed, collecting liquid draining from said catalyst bed at a point below the catalyst bed, withdrawing a substantial portion, but less than about 5% based on the original charge, of this collected liquid, and introducing the remaining portion of said collected liquid into the same catalyst bed at a point above that at which the vapor portion of the charge initially contacts the catalyst bed.

4. A process for destructively hydrogenating a high boiling hydrocarbon charge which contains residual components, which comprises heating said charge so as to vaporize a portion of it, passing the resultant vapor in conjunction with hydrogen-containing gas upwardly through a fixed hydrogenating catalyst bed, at a pressure of between about 100 and 2,000 p. s. i., introducing the liquid portion of the high boiling hydrocarbon into said hydrogenating catalyst bed, preventing formation of a body level of liquid in contact with the hydrogenating catalyst bed, removing reaction products from the upper portion of the catalyst bed, collecting liquid draining from said catalyst bed at a point below the catalyst bed, withdrawing a portion of this collected liquid, and introducing the remaining portion of said collected liquid into the upper part of the same catalyst bed.

5. A process for destructively hydrogenating a high boiling hydrocarbon charge which contains residual components, which comprises heating said charge so as to vaporize a portion of it, passing the resultant vapor in conjunction with hydrogen-containing gas upwardly through a fixed hydrogenating catalyst bed, at a pressure of between about 100 and 2,000 p. s. i., at a temperature between about 750° and 950° F., and at a space velocity between about 0.5 and 2.0, introducing the liquid portion of the high boiling hydrocarbon into said hydrogenating catalyst bed, preventing formation of a body level of liquid in contact with said fixed hydrogenating catalyst bed, removing reaction products from the upper portion of the catalyst bed, collecting liquid draining from said catalyst bed at a point below the catalyst bed, withdrawing a portion of this collected liquid, and introducing the remaining portion of said collected liquid into the same catalyst bed at a point above that at which the vapor portion of the charge initially contacts the catalyst bed.

CHARLES W. MONTGOMERY.
WILLIAM A. HORNE.

References Cited in the file of this patent

UNITED STATES PATENTS

| Number | Name | Date |
|---|---|---|
| 2,541,237 | Goodson | Feb. 13, 1951 |
| 2,541,267 | Mills et al. | Feb. 13, 1951 |
| 2,541,317 | Wilson | Feb. 13, 1951 |